United States Patent

Shibata et al.

[11] Patent Number: 6,041,293
[45] Date of Patent: *Mar. 21, 2000

[54] DOCUMENT PROCESSING METHOD AND APPARATUS THEREFOR FOR TRANSLATING KEYWORDS ACCORDING TO A MEANING OF EXTRACTED WORDS

[75] Inventors: Shogo Shibata, Kawasaki; Minoru Fujita; Yuji Ikeda, both of Yokohama; Takaya Ueda, Kawasaki; Fumiaki Itoh; Makoto Hirota, both of Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/657,042

[22] Filed: May 29, 1996

[30] Foreign Application Priority Data

May 31, 1995 [JP] Japan .................................... 7-134226

[51] Int. Cl.⁷ .................................................. G06F 17/28
[52] U.S. Cl. ...................... 704/4; 704/5; 704/7; 707/536; 707/4
[58] Field of Search ...................................... 704/4, 5, 2, 8, 704/7, 9, 1, 3, 10, 277; 707/530, 531, 532, 536, 535, 2, 3, 4, 5, 6

[56] References Cited

U.S. PATENT DOCUMENTS

| 4,393,460 | 7/1983 | Masuzawa et al. | 704/3 |
|---|---|---|---|
| 4,623,985 | 11/1986 | Morimoto et al. | 704/2 |
| 4,916,614 | 4/1990 | Kaji et al. | 704/2 |
| 5,029,084 | 7/1991 | Morohashi et al. | 704/9 |
| 5,140,522 | 8/1992 | Ito et al. | 704/2 |
| 5,267,156 | 11/1993 | Nomiyama | 704/10 |
| 5,373,442 | 12/1994 | Kutsumi et al. | 704/4 |
| 5,384,701 | 1/1995 | Stentiford et al. | 704/3 |
| 5,396,419 | 3/1995 | Morimoto | 704/2 |
| 5,477,451 | 12/1995 | Brown et al. | 704/9 |
| 5,510,981 | 4/1996 | Berger et al. | 704/2 |
| 5,608,623 | 3/1997 | Sata et al. | 704/4 |
| 5,612,872 | 3/1997 | Fujita | 704/2 |
| 5,619,410 | 4/1997 | Emori et al. | 704/7 |
| 5,642,518 | 6/1997 | Kiyama et al. | 704/7 |
| 5,765,131 | 6/1998 | Stentiford et al. | 704/277 |

Primary Examiner—Joseph Thomas
Attorney, Agent, or Firm—Fitzpatrick, Cella, Harper & Scinto

[57] ABSTRACT

A document processing apparatus and method extracts, from document data, both a first word, whose translation is to be determined, and a second word that is either the preceding word or the subsequent word of the first word. Then a keyword is extracted based on the frequency of occurrence of the first word and the keyword is translated into a predetermined language by referring to a dictionary in a process that considers a meaning of the first and second words existing together in the document data.

18 Claims, 4 Drawing Sheets

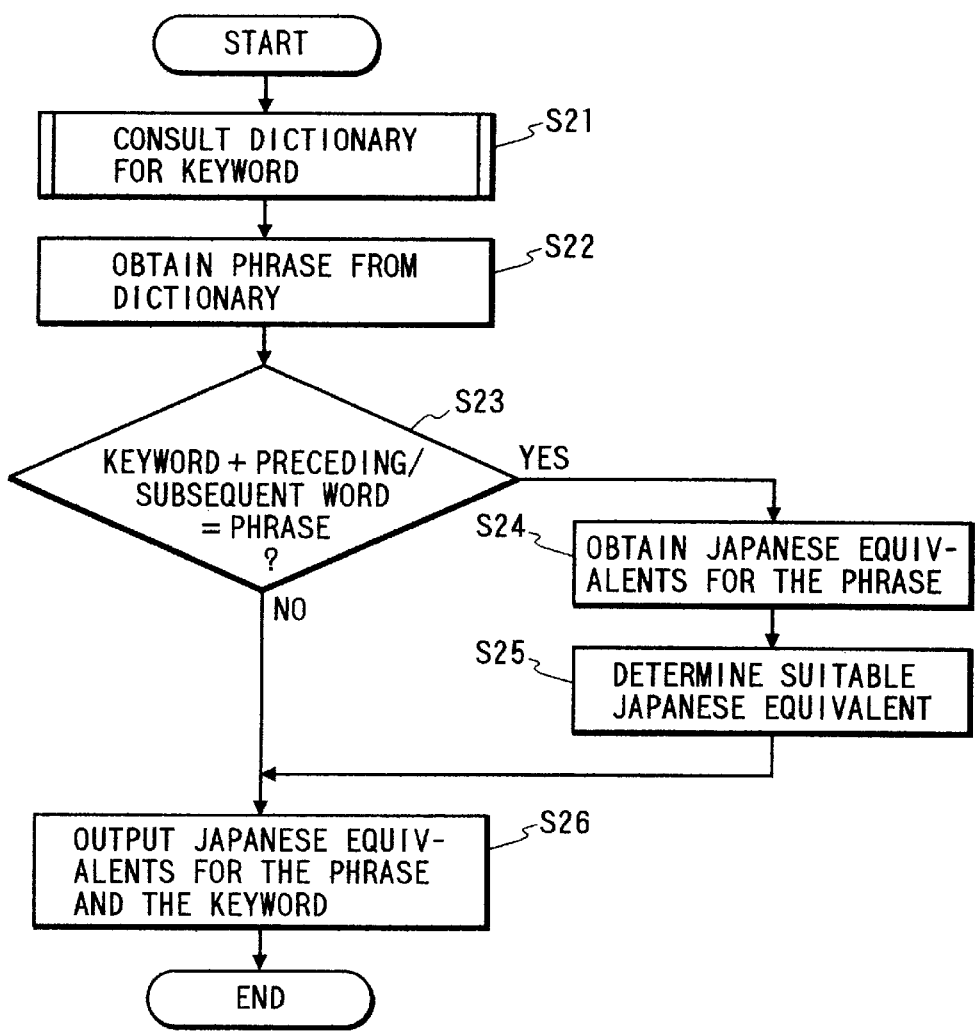
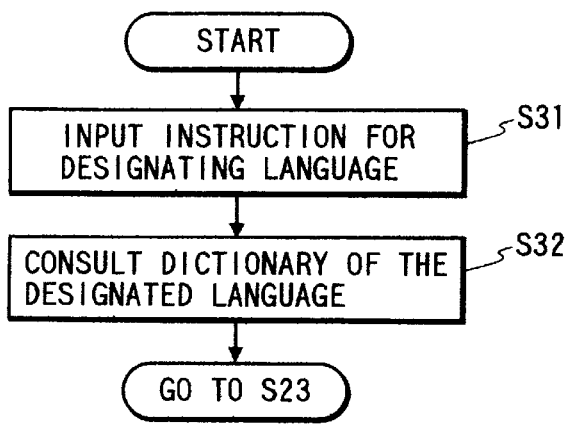

FIG. 5

LIST OF EXTRACTED WORDS

| EXTRACTED WORD | NO OF OCCURRENCES | PRECEDING WORD | NO OF OCCURRENCES | SUBSEQUENT WORD | NO OF OCCURRENCES |
|---|---|---|---|---|---|
| PRICE | 18 | increase | 3 | index | 2 |
|  |  | discount | 1 | level | 2 |
|  |  | . . . |  | change | 1 |

FIG. 6

DICTIONARY

| ORIGINAL LANGUAGE | TARGET LANGUAGE |
|---|---|
| price | 値段(Nedan), 物価(Bukka) |
| price index | 物価(Bukka) (1) 指数(Sisuu) (2) |
| price level | 物価(Bukka) (1) 水準(Suijun) (2) |
| . . . |  | in the document processing apparatus of the above-mentioned embodiment;

FIG. 5 is a table showing an example of the word extraction list in the document processing apparatus of the above-mentioned embodiment;

FIG. 6 is a table showing an example of the dictionary data in a document processing apparatus embodying the present invention; and FIG. 7 is a flow chart showing an input process for designation for the translated word in the document processing apparatus embodying the present invention.

DESCRIPTION OF THE PREFERRED EMBODIMENTS

DOCUMENT PROCESSING METHOD AND APPARATUS THEREFOR FOR TRANSLATING KEYWORDS ACCORDING TO A MEANING OF EXTRACTED WORDS

BACKGROUND OF THE INVENTION

1. Field of the Invention

The present invention relates to a document processing method and apparatus therefor, for extracting a keyword from document data and translating the keyword into another language.

2. Related Background Art

There is already known a document processing system capable, in case of storing multiple document information as a data base, of attaching a keyword to each document information and retrieving desired document information by entering such keyword. Such keyword is usually prepared and attached either by the operator for each document information or automatically by an application program.

For automatic attachment of the keyword to the document information with a computer, there is known a method of extracting a word, serving as the keyword, from the document information. For such keyword extraction, there is known a method of investigating the frequency of appearance of the words in the document data and extracting the keyword by statistically processing the frequency.

In case document data is written with a language other than the Japanese language and the keyword of such document data is to be read and displayed, it is desirable to display such keyword after conversion into the Japanese language. In such translation of the keyword, difficulty arises if the keyword has plural translated words. For selecting the proper translation of a word, it is necessary to understand how such word is used in the entire document. For understanding the meaning of the keyword, there is consequently required additional information such as the preceding and succeeding words of the keyword and the context thereof.

SUMMARY OF THE INVENTION

The object of the present invention is to provide, in an aspect of the present invention, a document processing apparatus comprising:

word extracting means for extracting a word from document data;

preceding subsequent word extracting means for extracting preceding and subsequent words of the word extracted by said word extracting means;

keyword extracting means for extracting a keyword of said document data, based on the frequency of occurrence of the word extracted by said word extracting means; and translation means for translating the keyword, extracted by said keyword extracting means, by referring to a translating dictionary, based on said preceding and succeeding words.

BRIEF DESCRIPTION OF THE DRAWINGS

FIG. 4 is a flow chart showing a translation process for the keyword in the document processing apparatus of the above-mentioned embodiment;

Now the present invention will be clarified in detail by a preferred embodiment thereof, with reference to the attached drawings.

Figure 1:
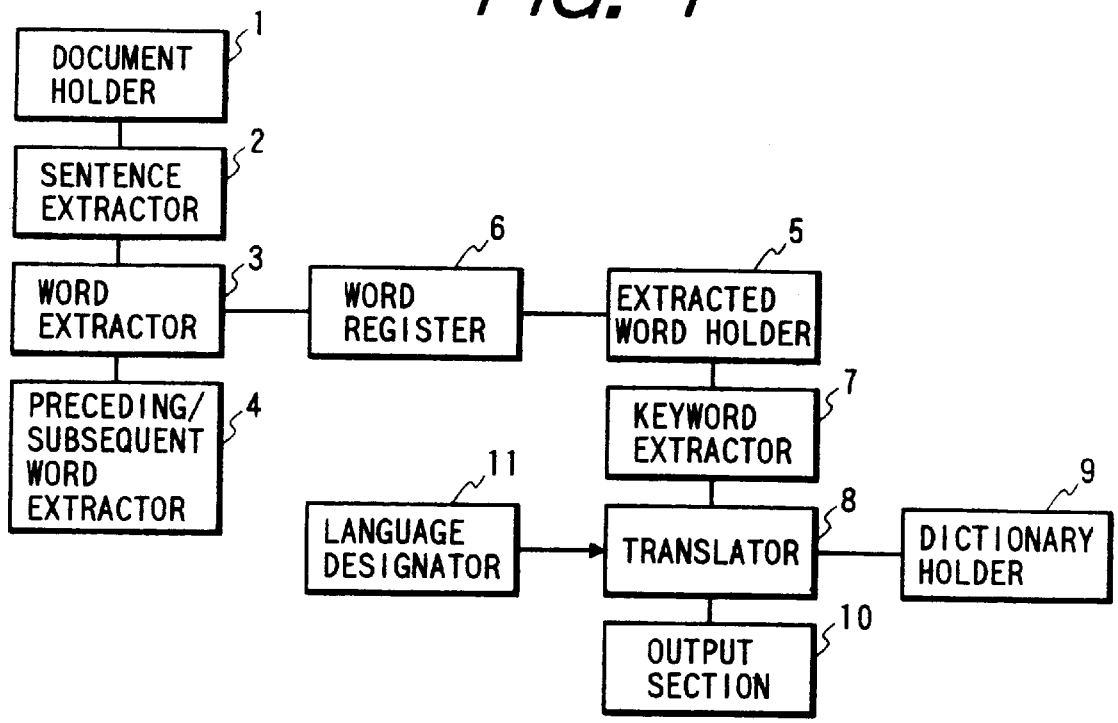
FIG. 1 is a functional block diagram showing the functional configuration of a document processing apparatus embodying the present invention.

FIG. 1 is a functional block diagram showing the functional configuration of a document processing apparatus embodying the present invention.

In FIG. 1, there are shown a document holding unit 1 for storing the entered document data; a sentence extracting unit 2 for extracting a sentence from the document data to be processed; a word extracting unit 3 for extracting a word from the sentence extracted by the sentence extracting unit 2; a preceding/subsequent word extracting unit 4 for extracting words in front of and behind the word extracted by the word extracting unit 3; an extracted word list holding unit 5 for registering the words extracted by the word extracting unit 3 and the preceding/subsequent word extracting unit 4; a word registering unit 6 for registering the word, extracted by the word extracting unit 3, in the extracted word list holding unit 5; a keyword extracting unit 7 for extracting a keyword from the extracted word list in the extracted word list holding unit 5 by a statistical method; a translating unit 8 for providing translated words to the keyword extracted by the keyword extracting unit 7 by referring to a translating dictionary stored in a dictionary holding unit 9; an output unit 10 for displaying or printing, for the user, the keyword translated by referring to the translating dictionary in the translating unit 8; and a language designating unit 11 for designating a language into which the extracted keyword is to be translated. The translating dictionary holding unit 9 of the present embodiment is provided with dictionaries of plural languages, and the translating unit 8 is capable of translating the keyword, extracted in the keyword extracting unit 7, into the language designated by the language designating unit 11, by referring to a corresponding dictionary. However such language designating unit 11 may be dispensed with if the language to which the translation is to be made is determined in advance.

Figure 2:
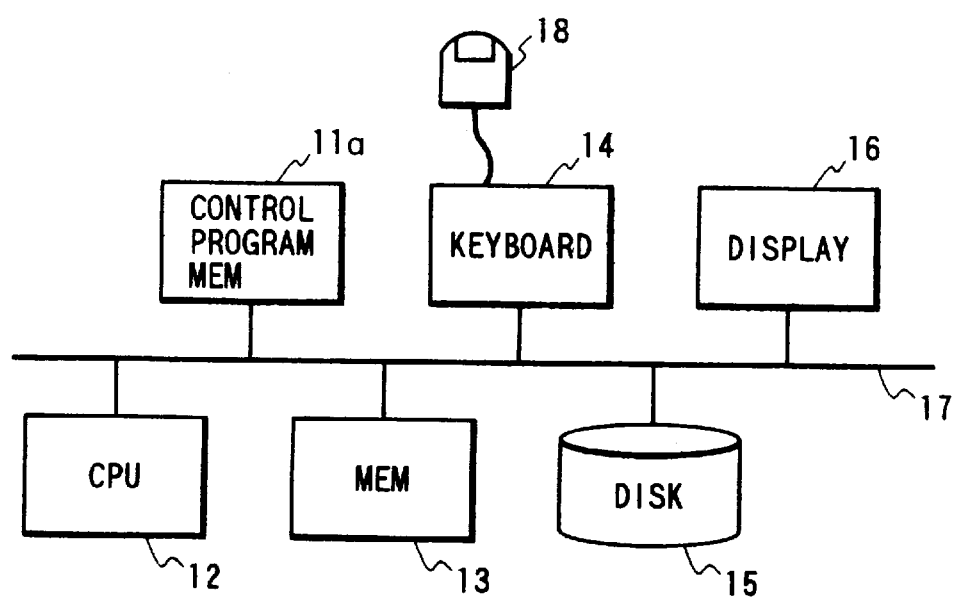
FIG. 2 is a block diagram showing the schematic configuration of a document processing apparatus embodying the present invention.

FIG. 2 is a block diagram showing the hardware configuration of the document processing apparatus of the present invention, for attaining the above-mentioned functions.

Figure 3:
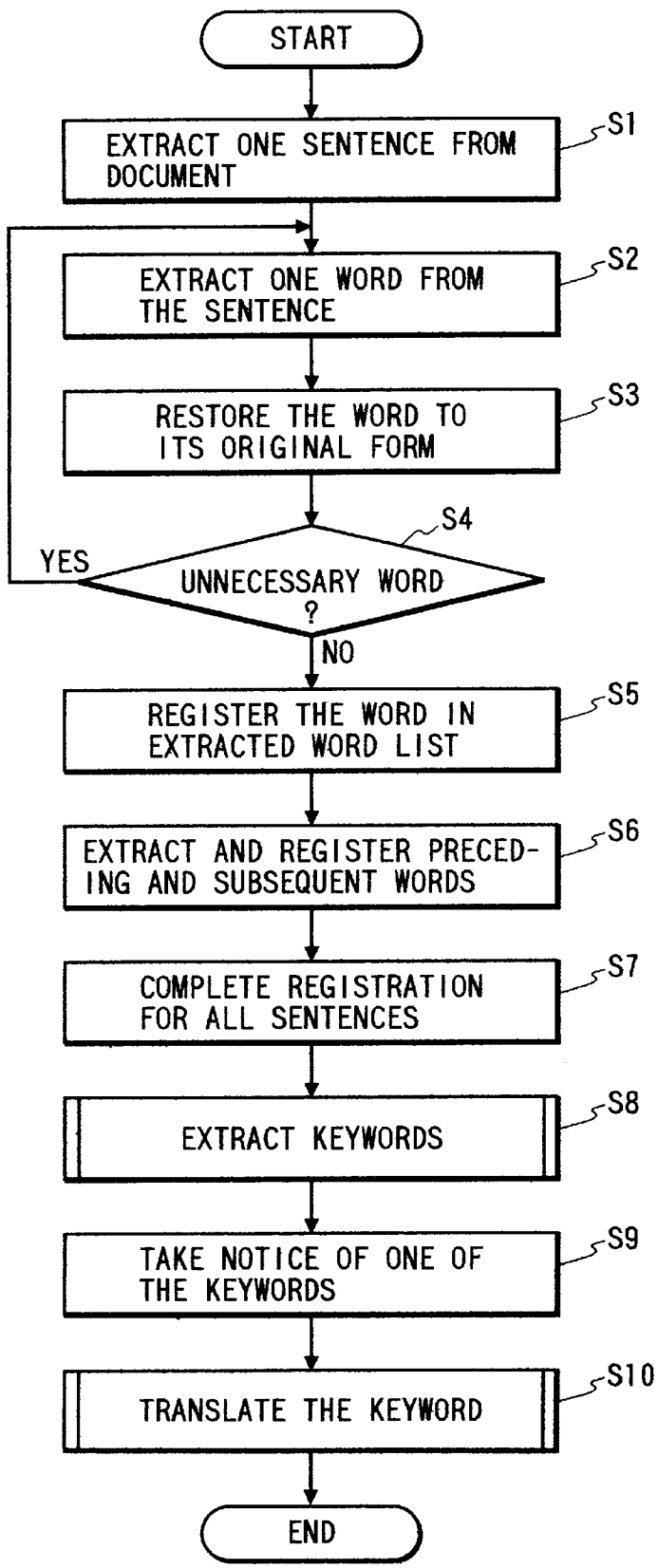
FIG. 3 is a flow chart showing the control sequence in the document processing apparatus of the above-mentioned embodiment.

Referring to FIG. 2, a control program memory 11a stores a control program for executing the control sequence shown by a flow chart in FIG. 3 and other various data. The control program memory 11a may be composed, for example, of a ROM or a RAM. A central processing unit (CPU) 12 executes various controls to be explained later, according to the control program stored in the control program memory 11a. A memory 13, composed for example of a RAM, is used as a work memory for temporarily storing various data in the execution of the control sequence by the CPU 12, and also serves as the document holding unit 1 and the extracted word list holding unit 5 in FIG. 1. A keyboard 14 is used for entering various data and commands by the operations of the operator and also for designating the language into which the translation is to be made, in the aforementioned language designating unit 11. There are further shown a pointing device 18 such as a mouse; a hard disk 15 storing the document data, the translating dictionaries etc.; a display unit 16, composed for example of a CRT or a liquid crystal display unit, for displaying the entered document data, the keyword etc.; and a system bus 17 connecting mutually the aforementioned components.

FIGS. 3 and 4 are flow charts showing the control sequences of the document processing unit of the present embodiment, and the corresponding programs are stored in the control program memory 11a in FIG. 2 and are executed by the CPU 12.

In the following the function of the document processing apparatus of the present embodiment will be explained with reference to these flow charts. In the following description, it is assumed that English document data are processed, and the extracted keyword is translated into the Japanese language. Also in the following description, a "sentence" is assumed to be composed of one, two or more clauses, with interruption of the sound at the start and at the end, and to be completed in the meaning at the last clause.

At first a step S1 extracts a sentence (corresponding to the function of the sentence extracting unit 2) from the document data read for example from the disk 15 and stored in the memory 13 (document holding unit 1), and a step S2 extracts a word (corresponding to the function of the word extracting unit 3) from the above-mentioned sentence. If the extracted word is in a flexed form, a step S3 restores its original form. The flexed form means a conjugated form in case of the Japanese language, or, in case of the English language, a past form, a plural form, an infinitive form of the verb with "s" at the end as employed for the third singular person, present tense. Then a step S4 discriminates whether the word is an unnecessary word, and, if so, the sequence returns to the step S2 to disregard the above-mentioned word and to process a next word. The unnecessary word means such word that appears frequently in any sentence and that cannot be used as the keyword, such as "koto" or "mono" in the Japanese language or "the" or "do" in the English language.

The discrimination in the step S4 may be conducted automatically by the CPU 12 with reference to the unnecessary words registered in advance, or by the operator who designates, with the keyboard 14 or the mouse 18, whether the extracted word displayed on the display unit 16 is unnecessary or not.

If the step S4 identifies that the extracted word is not the unnecessary word, a step S5 registers the word in an extracted word list (corresponding to the function of the word registration unit 6) and stores it in the extracted word list holding unit 5 in the memory 13. Then preceding and subsequent words of the extracted word are extracted (corresponding to the function of the preceding/subsequent word extracting unit 4 in FIG. 1) and are registered in the memory 13 in a step S6. Such process is executed for all the words in the document data stored in the memory 13 (document holding unit 1).

FIG. 5 shows an example of such extracted word list, thus extracted and stored in the memory 13.

As an example, for an expression ". . . increasing price level . . . ", "price" is extracted as a word, and "increase" and "level" are registered respectively as preceding and subsequent words in the extracted word list, which stores the preceding words and the numbers of occurrence thereof, the subsequent words and the numbers of occurrence thereof.

After the completion of the registration in the step S6 for all the document data stored in the memory 13, a step S8 extracts keywords by a statistical method, based on the data of the extracted word list stored in the memory 13. Then a step S9 selects one of the keywords, and a step S10 effects the translation of the keyword selected in the step S9.

In the following there will be explained, with reference to a flow chart in FIG. 4, the translation process in the step S10 in FIG. 3.

At first a step S21 translates the keyword (corresponding to the function of the translating unit 8), referring to the dictionary stored in the disk 15 (corresponding to the dictionary holding unit 9). In the present example, the word "price" is translated according to the dictionary. As a result, a content of the dictionary as shown in FIG. 6 can be retrieved.

Then, within the extracted word list shown in FIG. 5, there is checked whether the preceding or subsequent word is included as a customary phrase in the dictionary, starting from that of the highest number of occurrence. In the example shown in FIG. 5, the words "increase price", formed by the preceding word "increase" with the highest number "3" of occurrence and the keyword, are identified as not constituting a customary phrase, as they do not appear in the dictionary. Then the words "price index" and "price level", formed by the keyword and the subsequent words "index" and "level" with the number "2" of occurrence, are identified as customary phrase as they appear in the second and third lines of the dictionary in FIG. 6 (step S23).

If such customary phrase is present, the sequence proceeds to a step S24 to adopt, as the keywords, "bukka sisuu (price index)" and "bukka suijun (price level)" as the translations of the phrases "price index" and "price level". It is also identified that the extracted keyword "price" is to be translated as "bukka (price)" instead of "nedan (value)". Thus a step S25 registers this translation, and, if the word "price" is used as the keyword, "bukka (price)" is given as the translation.

The translation explained in the foregoing is conducted for all the keywords extracted from the document data.

FIG. 7 is a flow chart showing the process in case the target language is designated.

A step S31 awaits the input of the information designating the target language, entered by the keyboard 14 or the mouse 18. The designation is made by the entry of an instruction, such as "from English to Japanese" or "from French to English". However, if the language of the document data from which the word is to be extracted is already known, there may be simply designated the target language. Then a step S32 effects translation of the keywords, extracted at this point, into the language designated in the step S31 by referring to the dictionary corresponding to such designated language. When the translations to such keywords are found, the sequence proceeds to the step S23 in FIG. 4 to look for the optimum translation to each keyword, by referring to the phrases including the preceding and/or subsequent words of the keyword.

Also the designation of the target language, shown in the flow chart in FIG. 7, may be entered before the start of execution of the flow chart shown in FIG. 3, to determine in advance the language of the document data from which the keywords are to be extracted.

Also in relation to the foregoing description, there should be understood the following facts:

(1) The foregoing embodiment has been limited to the document data written in the English language, but there may also be processed the document data in any other language;

(2) The foregoing embodiment has been limited to the translation of the keywords into the Japanese language, but the translation may be made to any other language;

(3) In the foregoing embodiment, the phrase is extracted by the combination of the extracted word and a preceding or subsequent word of such extracted word, but there may also be considered the combination with two or more preceding or subsequent words;

(4) In the foregoing embodiment, the translated word is determined by the combination of the extracted word and the preceding or subsequent word, but the translation may also be determined from the information of the field, if the field of the document data (for example "computer related") can be specified at the keyword extraction; and (5) In the foregoing embodiment, the combination of the words is simply judged from the preceding or subsequent relationship, but the translation may also be determined from the structural information (for example a combination with an adjective in case of a noun, or a flexing part in case of a verb). Also there may be considered the information on meaning, in addition to the structural information.

The present invention is applicable not only to a system consisting of plural equipment but also to an apparatus consisting solely of a single equipment. It is further applicable to a case where the present invention can be attained by the supply of a program to a system or an apparatus.

As explained in the foregoing, the present invention enables extraction of the keyword with a language desired by the user, regardless of the language used in the original document data.

Also the present invention extracts a keyword from the document data and provides an appropriate translation to such keyword, thereby enabling prompt understanding of the content of the document data.

As explained in the foregoing, the present invention provides an effect of extracting a keyword from the document data and translating such keyword into a predetermined language.

Also the present invention provides an effect of exactly translating the keywords of the document data.

Furthermore, the present invention provides an effect of extracting a keyword outlining the document data and translating such keyword into a desired language.

Furthermore, the present invention provides an effect, at the extraction of the keyword, of storing preceding and/or subsequent words which are effective in the selection of the translation of the extracted word, thereby obtaining a phrase including the keyword or an appropriate translation of the keyword.

What is claimed is:

1. A document processing apparatus comprising:

first word extracting means for extracting a first word from document data;

preceding/subsequent word extracting means for extracting, from the document data, a second word that is one of a preceding word and a subsequent word of the first word;

keyword extracting means for extracting a keyword of the document data, based on a frequency of occurrence of the first word, wherein said keyword extracting means includes word counting means for counting a number of occurrences of each word, other than unnecessary words which are pre-excluded from being keywords, in the document data, said keyword extracting means extracting a word having a high number of occurrences, counted by said word counting means, as the keyword; and translation means for translating the keyword into a predetermined language by referring to a dictionary in a process that considers a meaning of the first and second words existing together in the document data.

2. A document processing apparatus according to claim 1, further comprising designation means for designating a language into which the translation is to be made by said translation means.

3. A document processing apparatus according to claim 1, wherein said dictionary includes at least a dictionary for correlating the Japanese language and a foreign language.

4. A document processing apparatus according to claim 1, further comprising output means for outputting a result of translation by said translation means.

5. A document processing apparatus according to claim 1, wherein said keyword extracting means extracts a word having a highest counted number of occurrences as the keyword.

6. A document processing apparatus according to claim 1, wherein said preceding/subsequent word extracting means includes preceding word counting means for counting a number of occurrences of each preceding word, which precedes each word in the document data, and subsequent word counting means for counting a number of occurrences of each subsequent word, which follows each word in the document data, said keyword extracting means selecting preceding and subsequent words having highest numbers of occurrences, counted respectively by said preceding and subsequent word counting means, as the preceding and subsequent words of the first word.

7. A document processing method comprising:

a first word extracting step for extracting a first word from document data;

a preceding/subsequent word extracting step for extracting, from the document data, a second word that is one of a preceding word and a subsequent word of the first word;

a keyword extracting step for extracting a keyword of the document data, based on a frequency of occurrence of the first word, wherein said keyword extracting step includes a word counting step of counting a number of occurrences of each word, other than unnecessary words which are pre-excluded from being keywords, in the document data, said keyword extracting step extracting a word having a high number of occurrences, counted by said word counting step, as the keyword; and a translation step for translating the keyword into a predetermined language by referring to a dictionary in a process that considers a meaning of the first and second words existing together in the document data.

8. A document processing method according to claim 7, further comprising a step for designating a language into which the translation is made in said translating step.

9. A document processing method according to claim 7, wherein said dictionary includes at least a dictionary for correlating the Japanese language and a foreign language.

10. A document processing method according to claim 7, further comprising a step for displaying or outputting a result of translation by said translating step.

11. A document processing method according to claim 7, wherein said keyword extracting step extracts a word with a highest counted number of occurrences as the keyword.

12. A document processing method according to claim 7, wherein said preceding/subsequent word extracting step includes a step for counting a number of occurrences of each preceding word, which precedes each word in the document data, and a number of occurrences of each subsequent word, which follows each word in the document data, said preceding/subsequent word extracting step selecting preceding and subsequent words having highest counted numbers of occurrences as the preceding and subsequent words of the first word.

13. A computer readable medium that stores a program for executing a document processing method comprising:
- a first word extracting step for extracting a first word from document data;
- a preceding/subsequent word extracting step for extracting, from the document data, a second word that is one of a preceding word and a subsequent word of the first word;
- a keyword extracting step for extracting a keyword of the document data, based on a frequency of occurrence of the first word, wherein said keyword extracting step includes a word counting step of counting a number of occurrences of each word, other than unnecessary words which are pre-excluded from being keywords, in the document data, said keyword extracting step extracting a word having a high number of occurrences, counted by said word counting step, as the keyword; and
- a translation step for translating the keyword into a predetermined language by referring to a dictionary in a process that considers a meaning of the first and second words existing together in the document data.

14. A medium according to claim 13, said method further comprising a step for designating a language into which the translation is made in said translating step.

15. A medium according to claim 13, wherein said dictionary includes at least a dictionary for correlating the Japanese language and a foreign language.

16. A medium according to claim 13, further comprising a step for displaying or outputting a result of translation by said translating step.

17. A medium according to claim 13, wherein said keyword extracting step extracts a word with a highest counted number of occurrences as the keyword.

18. A medium according to claim 13, wherein said preceding/subsequent word extracting step includes a step for counting a number of occurrences of each preceding word, which precedes each word in the document data, and a number of occurrences of each subsequent word, which follows each word in the document data, said preceding/subsequent word extracting step selecting preceding and subsequent words having highest counted numbers of occurrences as the preceding and subsequent words of the first word.

* * * * *

UNITED STATES PATENT AND TRADEMARK OFFICE
CERTIFICATE OF CORRECTION

PATENT NO.    : 6,041,293
DATED         : March 21, 2000
INVENTOR(S)   : Shogo Shibata et al.

It is certified that error appears in the above-identified patent and that said Letters Patent is hereby corrected as shown below:

Column 1,
Line 46, "preceding subsequent" should read -- preceding/subsequent --.

Column 4,
Line 30, "phrase" should read -- phrases --.

Column 5,
Line 18, "at" should read -- as --.

Signed and Sealed this

Twelfth Day of March, 2002

Attest:

JAMES E. ROGAN
Attesting Officer    Director of the United States Patent and Trademark Office